(12) United States Patent
Raghavan et al.

(10) Patent No.: US 11,308,249 B2
(45) Date of Patent: Apr. 19, 2022

(54) HYBRID SUPPORT STRUCTURES FOR ADDITIVELY PRINTED PARTS

(71) Applicant: General Electric Company, Schenectady, NY (US)

(72) Inventors: Sathyanarayanan Raghavan, Niskayuna, NY (US); Ananda Barua, Schenectady, NY (US); Evan Dozier, Greenville, NC (US); Joseph Block, Greenville, NC (US); Brendon Leary, Greenville, NC (US); Prabhjot Singh, Guilderland, NY (US); Arvind Rangarajan, San Ramon, CA (US); Changjie Sun, Schenectady, NY (US); Dean Robinson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 16/457,147

(22) Filed: Jun. 28, 2019

(65) Prior Publication Data
US 2020/0410061 A1 Dec. 31, 2020

(51) Int. Cl.
*G06F 30/20* (2020.01)
*B29C 64/393* (2017.01)
*B29C 64/40* (2017.01)
*B33Y 40/00* (2020.01)
*B33Y 50/02* (2015.01)
(Continued)

(52) U.S. Cl.
CPC ............ *G06F 30/20* (2020.01); *B29C 64/393* (2017.08); *B29C 64/40* (2017.08); *B33Y 40/00* (2014.12); *B33Y 50/02* (2014.12); *G06F 2119/08* (2020.01); *G06F 2119/18* (2020.01)

(58) Field of Classification Search
None
See application file for complete search history.

(56) References Cited

U.S. PATENT DOCUMENTS 10,011,079 B2 7/2018 Wighton et al.
10,052,812 B2 8/2018 Urbanic
(Continued)

OTHER PUBLICATIONS

Jiang et al. 'Support Structures for Additive Manufacturing: A Review' J. Manuf. Mater. Process. 2018, 2, 64, pp. 1-23.*
(Continued)

*Primary Examiner* — Bernard G Lindsay
(74) *Attorney, Agent, or Firm* — Hanley, Flight & Zimmerman, LLC

(57) ABSTRACT

A method, medium, and system to receive a specification defining a model of a part to be produced by an additive manufacturing (AM) process; execute an AM simulation on the model of the part to determine a prediction of thermal distortions to the part; execute a topology optimization (TO) to create TO supports that counteract the predicted thermal distortions; generate at least one rule-based support based on a geometry of the part to interface with the part at one or more regions other than the TO supports; combining the TO supports and the at least one rule-based support to generate a set of hybrid supports; save a record of the set of hybrid supports; and transmit the record of the set of hybrid supports to an AM controller to control an AM system to generate a support structure for an AM production of the part.

19 Claims, 11 Drawing Sheets

(51) Int. Cl.
  *G06F 119/08* (2020.01)
  *G06F 119/18* (2020.01)

(56) References Cited

U.S. PATENT DOCUMENTS

| | | | |
|---|---|---|---|
| 2014/0277669 | A1 | 9/2014 | Nardi et al. |
| 2015/0151493 | A1 | 6/2015 | Schmidt |
| 2016/0107234 | A1 | 4/2016 | Craeghs et al. |
| 2016/0107393 | A1 | 4/2016 | Hartmann et al. |
| 2016/0221262 | A1* | 8/2016 | Das .................... B29C 35/0805 |
| 2017/0372480 | A1 | 12/2017 | Anand et al. |
| 2018/0029306 | A1 | 2/2018 | Gold et al. |
| 2018/0079149 | A1 | 3/2018 | Suresh et al. |
| 2019/0079491 | A1 | 3/2019 | Barua et al. |
| 2020/0004225 | A1* | 1/2020 | Buller .................... B33Y 50/02 |
| 2020/0150623 | A1* | 5/2020 | Bandara ............... G05B 19/182 |
| 2021/0046710 | A1* | 2/2021 | Koopmans ............ B29C 64/106 |

OTHER PUBLICATIONS

Strano, G. et al., "A new approach to the design and optimisation of support structures in additive manufacturing", The International Journal of Advanced Manufacturing Technology, vol. 66, Issue: 9-12, Jun. 2013, DOI: 10.1007/s00170-012-4403-x, (pp. 1247-1254, 8 total pages).

Langelaar, Matthijs "Topology optimization of 3D self-supporting structures for additive manufacturing", Additive Manufacturing, vol. 12, Oct. 2016, DOI: 10 1016/j.addma.2016.06.010, (pp. 60-70, 11 total pages).

International Searching Authority, "Search report and Written Opinion," issued in connection with PCT patent application No. PCT/US2020/038067, dated Sep. 21, 2020, 16 pages.

Zhou et al., "Topology optimization of thermal conductive support structures for laser additive manufacturing," Computer Methods in Applied Mechanics and Engineering, vol. 353, May 6, 2019 (May 6, 2019), retrieved from https://www sciencedirect com/science/article/abs/pii/S00457825 19301938?via%3Dihub, 10 pages.

Lin Cheng et al, "On utilizing topology optimization to design support structure to prevent residual stress induced build failure in laser powder bed metal additive manufacturing", Additive Manufacturing, vol. 27, Mar. 9, 2019 (Mar. 9, 2019), p. 290-304, XP055728997 DOI: 10.1016/j.addma.2019.03.001, 31 pages.

Grégoire Allaire et al, "Optimizing supports for additive manufacturing", Structural and Multidisciplinary Optimization, vol. 58, No. 6, Oct. 30, 2018 (Oct. 30, 2018), p. 2493-2515, XP055573062, 31 pages.

* cited by examiner

| Support | Max Distortion (magnitude, mm) | Mean Distortion (magnitude, mm) | Standard Deviation (magnitude, mm) |
|---|---|---|---|
| Expert Designed | 2.63 (103.5 mils) | 0.68 (26.8 mils) | 0.38 (15 mils) |
| Topology Optimized | 2.11 (83 mils (at unsupported region)) | 0.43 (16.9 mils) | 0.26 (10.4 mils) |
| Topology Optimized - 14 in³ | 3.11 (122 mils) | 0.83 (32.7 mils) | 0.42 (16.5 mils) |
| Hybrid Supports - 15.6 in³ | 1.7 (67 mils) | 0.58 (22.8 mils) | 0.24 (9.4 mils) |

*FIG. 14*

HYBRID SUPPORT STRUCTURES FOR ADDITIVELY PRINTED PARTS

BACKGROUND

The field of the present disclosure generally relates to additive manufacturing, and more particularly, to an additive manufacturing tool to determine optimal support structures for an additive manufacturing process.

Parts generated using additive manufacturing (AM) processes oftentimes require sacrificial support structures that facilitate the part build, where the support structures do not ultimately comprise a portion of the part being built. In some respects, the support structures might provide a measure of structural stiffness to the part during the AM build of the part. In some other respects, a support structure might provide a thermal pathway for thermal energy to be rejected from the part. In general, support structures might be used in regions of a part with an overhang and non-overhang surfaces that might need to be stabilized against distortions.

In a number of AM processes, the design of support structures for producing a part presents a complex challenge and is often a bottleneck in the AM process. In general, a traditional AM support design process might include a design phase, print phase, and repeated iterations of the design and print phases until the produced part meets design specifications. For example, supports for an AM part might be initially designed based on geometry-based considerations of the part, including designer/engineer experience. Thereafter, the part and supports may be generated by AM. The generated part can then be analyzed for distortions between the design specifications for the part and the actual AM produced part. The supports may be redesigned to further reduce the distortions, wherein the redesign is then produced by AM to determine whether the part is produced with acceptable distortions (i.e., the generated part is within predetermined tolerances of the design specifications for the part). The redesign and printing of the part based on the redesign may be iteratively repeated until the part is produced with minimal or acceptable distortions. It is noted that this design—print—iterate approach can usually result in very time-consuming design cycle, where a design time of 6-24 months is not uncommon.

Accordingly, in some respects, a need exists for methods and systems that provide an efficient and accurate mechanism for designing AM support structures.

BRIEF DESCRIPTION

According to some embodiments, a method includes receiving, by a processor, a specification defining a model of a part to be produced by an additive manufacturing (AM) process; executing an AM simulation on the model of the part, by the processor, to determine a prediction of thermal distortions to the part due the AM process; executing a topology optimization (TO), by the processor, based at least in part on boundary conditions from the AM simulation, to create TO supports for a given support volume that counteract the predicted thermal distortions; generating, by the processor, at least one rule-based support based on a geometry of the part and rules specifying supports for specific geometric features of a part, the at least one rule-based support to interface with the part at one or more regions other than the TO supports; combining, by the processor, the TO supports and the at least one rule-based support to generate a set of hybrid supports; saving a record of the set of hybrid supports; and transmitting the record of the set of hybrid supports to an AM controller, the AM controller to control an AM system to generate a support structure for an AM production of the part.

According to some embodiments, a system includes a memory storing processor-executable instructions; and one or more processors to execute the processor-executable instructions to receive a specification defining a model of a part to be produced by an additive manufacturing (AM) process; execute an AM simulation on the model of the part to determine a prediction of thermal distortions to the part due the AM process; execute a topology optimization (TO) based at least in part on boundary conditions from the AM simulation to create TO supports for a given support volume that counteract the predicted thermal distortions; generate at least one rule-based support based on a geometry of the part and rules specifying supports for specific geometric features of a part, the at least one rule-based support to interface with the part at one or more regions other than the TO supports; combine the TO supports and the at least one rule-based support to generate a set of hybrid supports; save a record of the set of hybrid supports; and transmit the record of the set of hybrid supports to an AM controller, the AM controller to control an AM system to generate a support structure for an AM production of the part.

According to some embodiments, a non-transitory computer readable medium includes receiving a specification defining a model of a part to be produced by an additive manufacturing (AM) process; executing an AM simulation on the model of the part to determine a prediction of thermal distortions to the part due the AM process; executing a topology optimization (TO) based at least in part on boundary conditions from the AM simulation, to create TO supports for a given support volume that counteract the predicted thermal distortions; generating at least one rule-based support based on a geometry of the part and rules specifying supports for specific geometric features of a part, the at least one rule-based support to interface with the part at one or more regions other than the TO supports; combining the TO supports and the at least one rule-based support to generate a set of hybrid supports; saving a record of the set of hybrid supports; and transmitting the record of the set of hybrid supports to an AM controller, the AM controller to control an AM system to generate a support structure for an AM production of the part.

Other embodiments are associated with systems and/or computer-readable medium storing instructions to perform any of the methods described herein.

BRIEF DESCRIPTION OF THE DRAWINGS

FIG. 14 is an example table listing some distortions realized for different types of AM process supports, including a set of hybrid supports designed in accordance with some embodiments.

DETAILED DESCRIPTION

Embodying systems and methods herein relate to Additive Manufacturing (AM) systems that, in general, produce a three-dimensional (3D) object or assembly by printing materials under computer control. AM may successively add materials, for example in layers, to create the three-dimensional assembly or object based on 3D model data (i.e., a specification). In general, parts generated using AM processes might require support structures that facilitate the part build, wherein the support structures might provide a measure of structural stiffness and/or a thermal pathway for thermal energy to be rejected from the part during the AM build of the part. The present disclosure discloses a methodology and system to design optimized support structures for AM processes. In some aspects, the methodologies and systems disclosed herein may significantly reduce the time needed to realize a part by AM that satisfies its design specifications by, for example, reducing the number of print iterations needed to design the support structures that are both buildable and removable from the part.

In some aspects, the technological aspects disclosed herein include methods and systems for designing optimized support structures to minimize part distortion. In some aspects, processes and systems herein might minimize part distortions using a minimal amount of support material.

In some embodiments, the present disclosure combines geometry-based support design and enhanced topology optimized (TO) supports to yield a set of hybrid supports for an AM produced part. In some aspects, the TO supports may be designed to counteract part distortions. That is, the TO supports herein may not be designed to merely support a part during an AM build but to further resist and/or counteract the occurrence of distortions. In some embodiments, constraints may be considered during a design process herein so that the TO supports are actually buildable. In some embodiments, the TO supports may be attached to or interfaced with the part at machined surfaces of the part for easy (or at least easier) removable of the support from the part. In some embodiments, geometry-based supports might be used for regions requiring support but unsuitable for attachment of TO supports (i.e., non-machinable regions). In some embodiments, build iterations disclosed herein might use thermal prediction analysis tools and/or techniques to achieve buildability, as well as part distortion targets.

Figure 1:
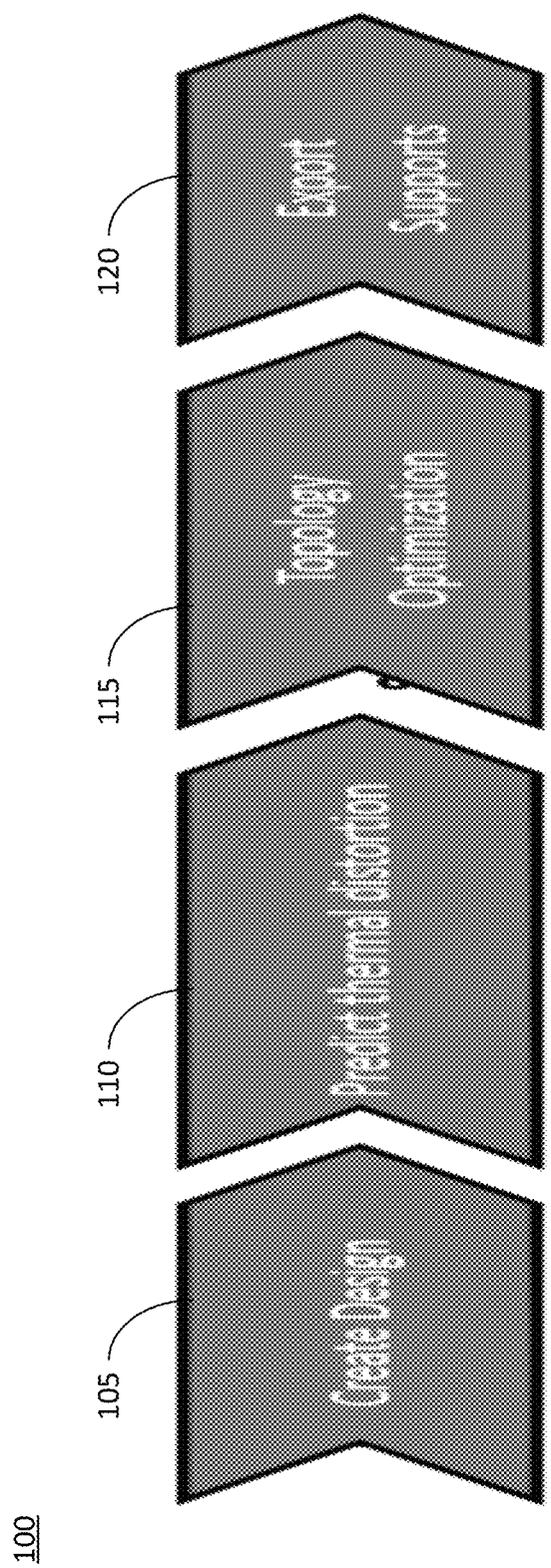
FIG. 1 is an illustrative flow of a topology optimization (TO) for generating supports.

In some aspects, the present disclosure leverages an automated support generation process, such as the process 100 depicted in FIG. 1. Process 100 may be implemented by one or more software and hardware components, whether commercially available, proprietary, open-source, and combinations thereof. Process 100 relates to a topology optimized (TO) process wherein a design space is created at operation 105. The design space may be created within a design software application and is used to determine where and how much support material is used within the design space for a particular design project and its objectives.

Figure 2:
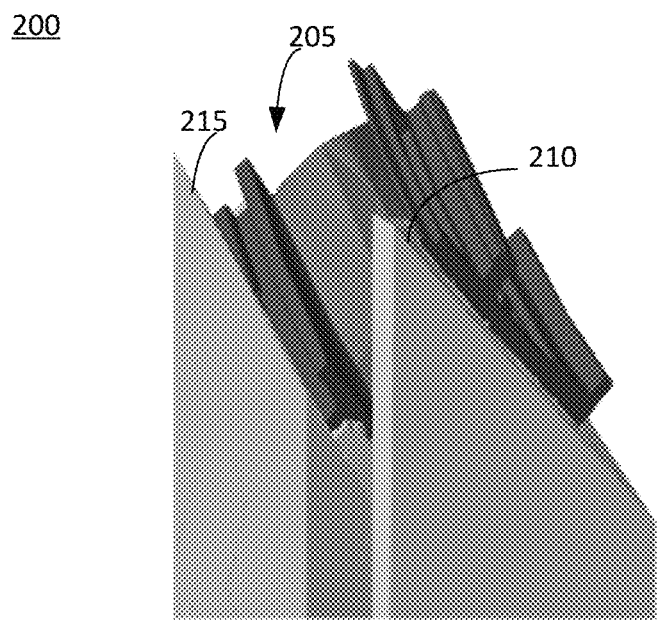
FIG. 2 is an illustrative depiction of a design space, in accordance with some embodiments.

FIG. 2 is an illustrative depiction of a negative volume approach that can be used to create a design space 200, wherein the interfaces 210 and 215 between a part 205 and supports can be identified. The negative volume 200 represents the space or volume which can contain the TO supports for part 205. In some embodiments, the design space(s) herein interface with the part at locations or regions where the part is machinable. In some aspects, the design space(s) may be constrained to fit within an actual build space of an AM system or device.

Figure 3:
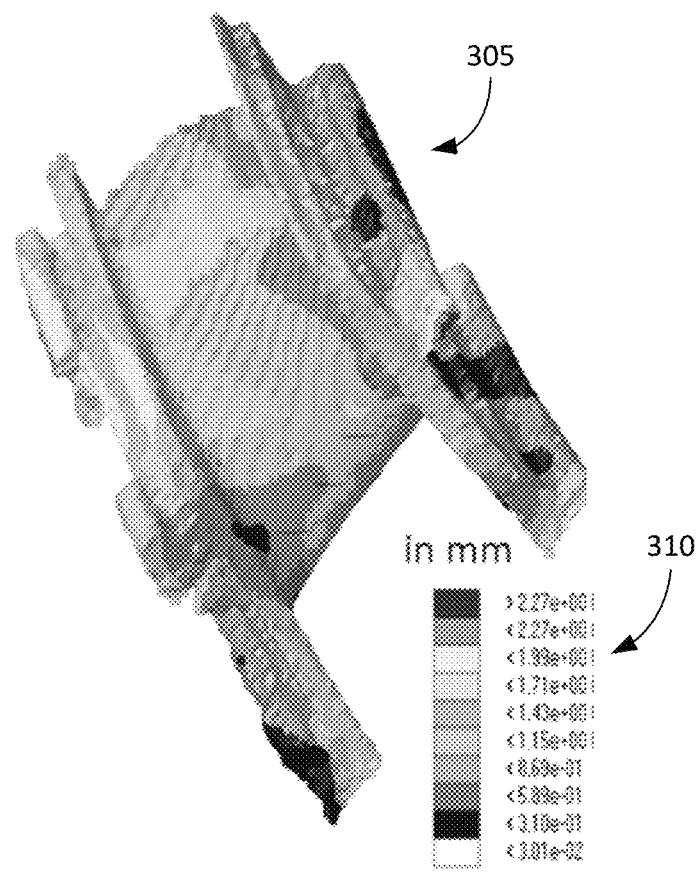
FIG. 3 is an illustrative depiction of a part generated during the process of FIG. 2, in accordance with some embodiments.

At operation 110, a thermal distortion analysis is performed on an AM process simulation for a part to determine a prediction of how the part, without any support(s), will distort or move during the AM process. Operation 110 may provide a prediction of how the part will distort (i.e., deviate from the part's design specifications) during the AM build of the part. FIG. 3 is an illustrative depiction of a part 305 produced by a simulated AM process, where the color (i.e., shading) of the part at any region thereof corresponds to the color-coded distortion key 310. Each color on the color-coded distortion key corresponds to a different range of distortion of the part resulting from the AM process.

Figure 4:
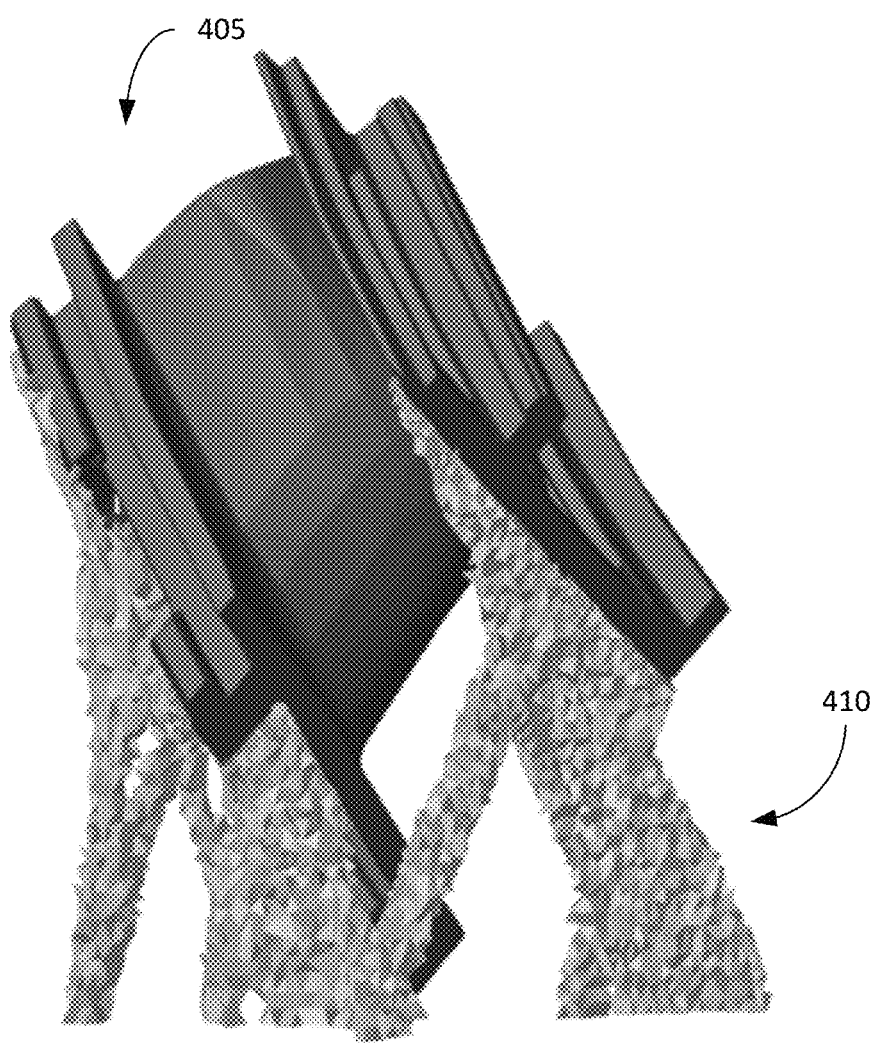
FIG. 4 is an illustrative depiction of a topology optimization supports generated during another phase of the process of FIG. 2, in accordance with some embodiments.

At operation 115, a topology optimization (TO) functions to determine what supports should be added onto the part so that the part does not distort or otherwise move during the AM process. In order for the TO to achieve its objectives, it receives one or more boundary conditions, wherein the boundary conditions are derived from the thermal distortion prediction of operation 110. In some instances, the boundary conditions might specify, for example, a support volume size, permissible part distortions, overhang angles, other parameters. In some aspects, the distortions may be converted to forces and applied to the part—support interfaces of the part. FIG. 4 is an illustrative depiction of TO generated supports or support structure 410 interfaced with a part 405.

Figure 5B:
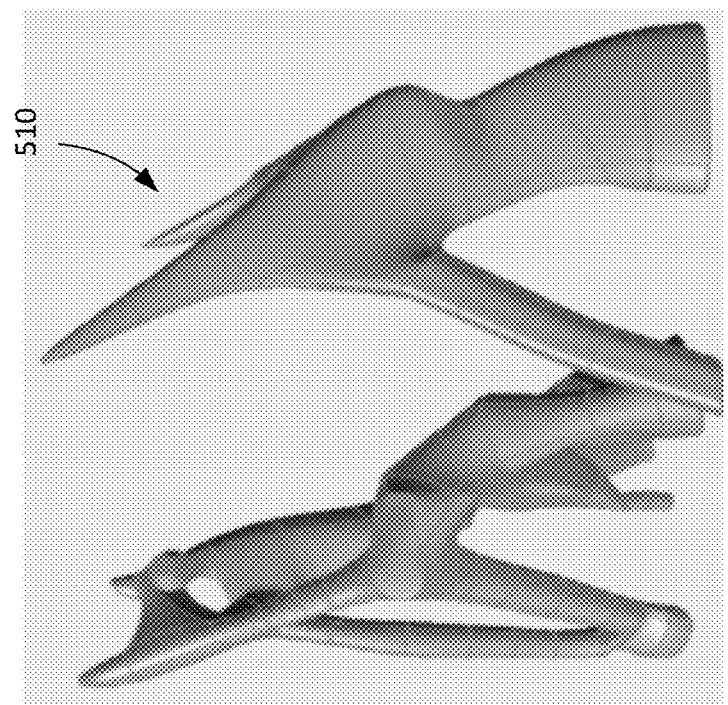
FIGS. 5A and 5B are illustrative depictions of distortions for an AM generated part with TO supports and hybrid supports, respectively, in accordance with some embodiments.
Figure 5A:
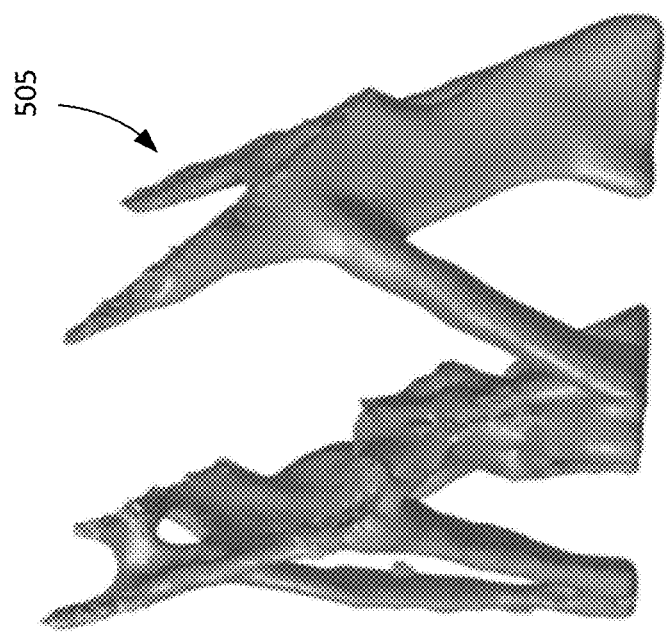

At operation 120 of FIG. 1, the support structure(s) generated by the TO at operation 115 can be exported to, for example, an AM system using one or more modeling methods and/or tools. The AM system or process may receive the TO generated support structure(s) and process them to be attached to the part and printed with the part during the AM build of the part. FIGS. 5A and 5B each include depictions of TO support structures for a same part, where the support structure 505 of FIG. 5A is rendered by a first rendering engine and the support structure 510 of FIG. 5B is rendered by a second rendering engine, although fewer or additional rendering engines might be used in some implementations.

In general, it may be desirable that an AM process for a part herein will produce parts that are (1) within tolerance of design specifications, (2) buildable or actually realizable by an AM system, and (3) practicably removeable from support structure(s) generated during the AM process. However, simultaneously achieving all of these objectives may be technically feasible based on the present disclosure.

Figure 6:
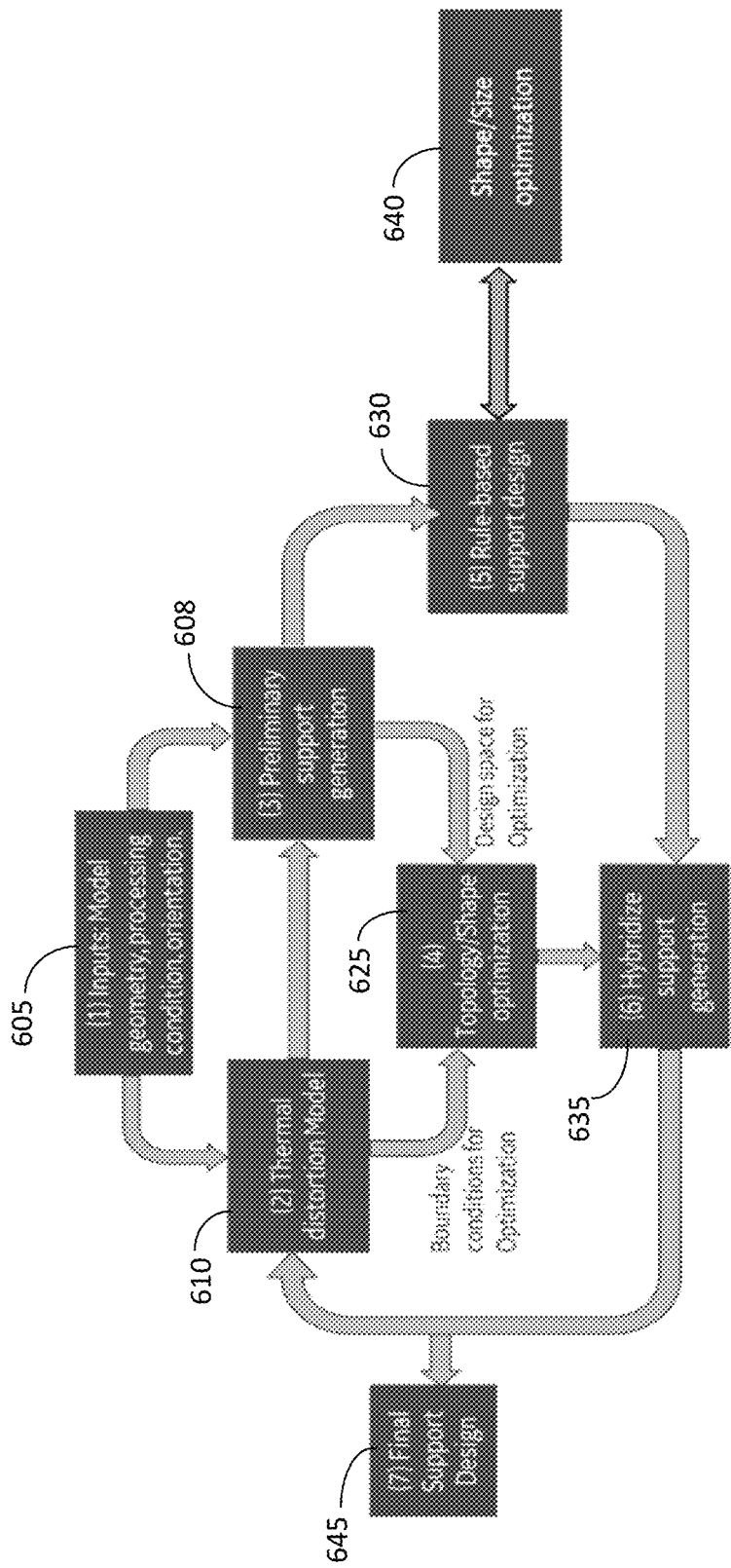
FIG. 6 is an illustrative depiction of a hybrid support design process, in accordance with some embodiments.

FIG. 6 is an example of an overall flow diagram of a process herein. Process 600 includes an iterative loop between two main analysis, (1) a process simulation of an AM process and (2) a topology optimization of a support design space. Referring to FIG. 6, operation 605 inputs are received from an engineer, designer, or other entity. The inputs may include a specification including one or more of a model part's geometry, part orientation, AM system/device capabilities, etc. The inputs received at 605 may be used by an AM simulation process at 610 to generate a thermal distortions model that will predict how the part to be produced will distort, without any supports. In some embodiments, the thermal distortions model might be generated by a simulation including some supports supporting the part to be generated. The thermal distortion model generated at operation 610 may be used to derive boundary conditions for a topology optimization (TO) operation at 625.

Referring back to the inputs received at operation 605, at least some of the received inputs (e.g., the geometry of the part to be produced) may be used at operation 608 to generate preliminary support(s) for the part. In some aspects, the preliminary support(s) may be generated primarily or sometimes solely based on geometric considerations of the part. The preliminary support(s) may further be used to define design space(s) for the support optimization of process 600.

At operation 625, the boundary conditions derived from the thermal distortion model and the design space(s) from operation 608 are received and used by a TO process to generate a set of TO supports that interface with the part at, for example, machinable regions.

At operation 635, the TO supports from operation 625 may be combined with geometry-based supports that interface with the part at regions or locations other than the machinable surfaces of the part that also need supporting to obtain a set of hybrid supports. The geometry-based supports may be received from a rule-based support design operation 630 that applies one or more rules, including geometry-based rules and constraints, to the preliminary supports of operation 608. In some aspects, the TO supports from operation 625 provide rigidity to the support structure and counteracts thermally-induced distortions while the geometry-based supports from operation 630 provide support at locations other than the machinable regions (i.e., non-machinable regions) such as, for example overhangs on the part, which may still need to be supported in order to actually produce or print the part by an AM process.

In some embodiments, the set of hybrid supports may be optimized at operation 640. This optimization may consider additional constraints such as, for example, part shape and/or size related factors, a particular AM processes constraints, materials, etc. The shape/size optimization of operation 640 may be used by the rule-based support design of operation 630 that is forwarded to operation 635 where the hybrid set of supports is generated.

Additionally, the set of hybrid supports may be submitted to the AM simulation process of operation 610 to further refine and/or verify that the initial or previous set of hybrid supports fully satisfy the design objections of process 600. In some embodiments, operations including the AM simulation process of operation 610 and the TO process of operation 625 may be iteratively repeated until design specifications of the part to be produced by the AM process are met/satisfied. A final set of hybrid supports may be saved to a file or other data structure at operation 645. The final set of hybrid supports may be, for example, transmitted to a control system of an AM system and used by a controller thereof to produce the part with the hybrid supports structure specified in the final set of hybrid supports file, record, or other data structure.

In some embodiments, one or more of the TO supports disclosed herein might not be connected to or interface with a part only at a machinable surface or region. For example, in some embodiments a "neck" region may be added between a part and a TO support herein, another part or component might be added between a subject part and the TO support, and other techniques, alone or in combination, might be employed to interface one or more of the TO supports disclosed herein with a non-machinable surface or region of a part.

Figure 7:
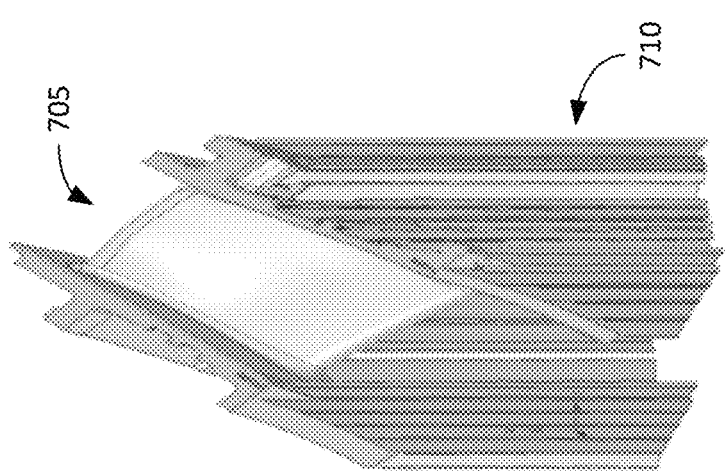

FIGS. 7-13 illustrate example aspects of the design of a set of hybrid supports, in some embodiments herein. FIG. 7 is an illustrative depiction of part 705 and baseline or preliminary supports 710 that provide structural support to the part. In some aspects, the baseline supports are generated primarily based on geometric considerations of the part.

Figure 8:
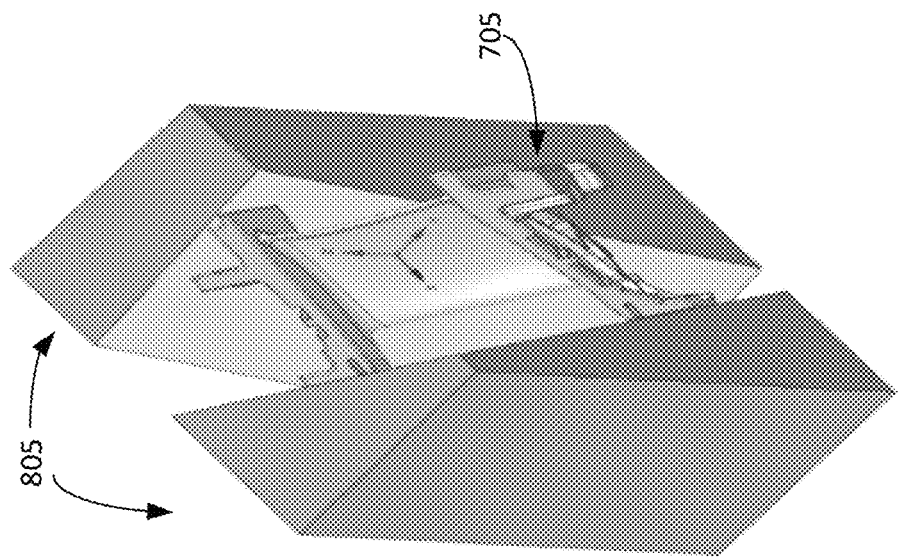
FIGS. 7-13 illustrate example aspects of the design of a set of hybrid supports, in some embodiments herein.
Figure 10:
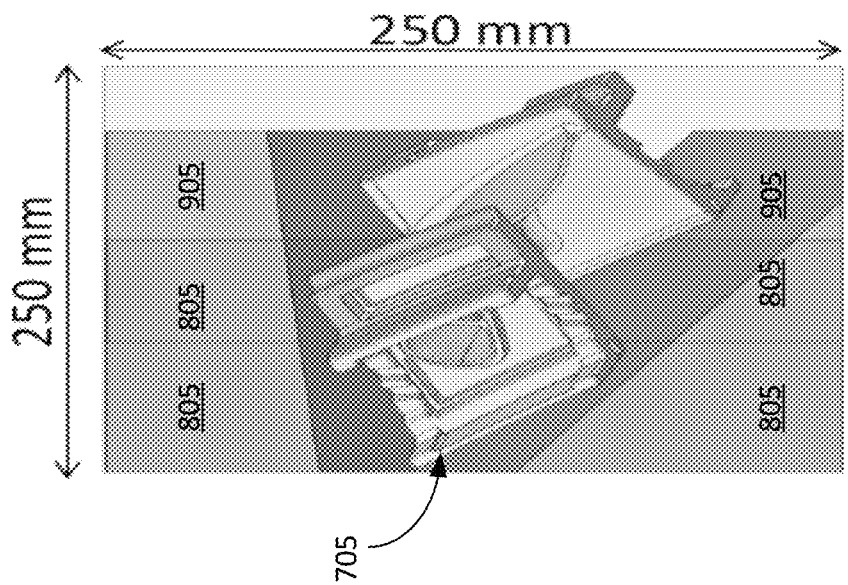
Figure 9:
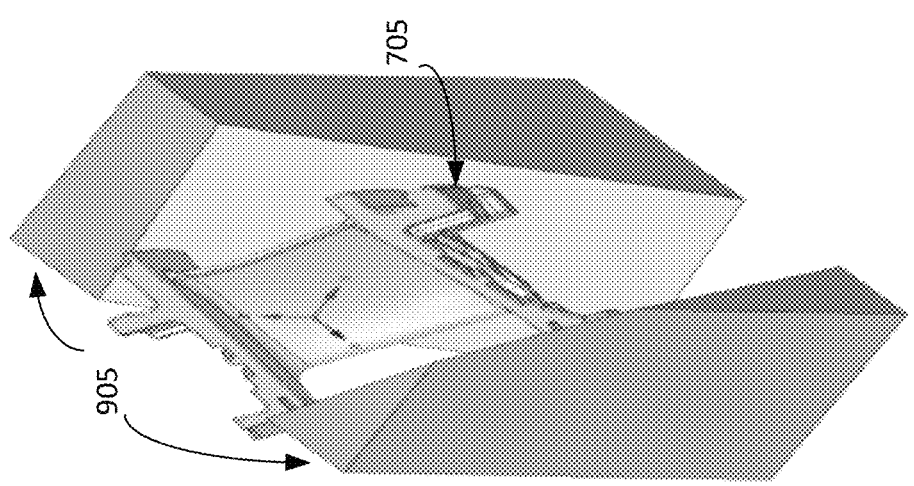

FIG. 8 is an illustrative example of a first design space that encompasses a top portion of the part 705, wherein the first design space 805 is shown interfacing with the part at machinable regions thereof. FIG. 9 is an illustrative example of a second design space 905 that encompasses a lower portion of the part 705, wherein the second design space is shown interfacing with the part at machinable regions of the part. FIG. 10 is an illustrative example of both the first design space of FIG. 8 and the second design space of FIG. 9, which encompasses the entirety of part 705. A key aspect illustrated in FIG. 10 is that the entire design space(s) and part fits within an AM system's build space. In the example of FIG. 10, the entire design space(s) and the part fits within the build space that measures 250 mm×250 mm.

Figure 12:
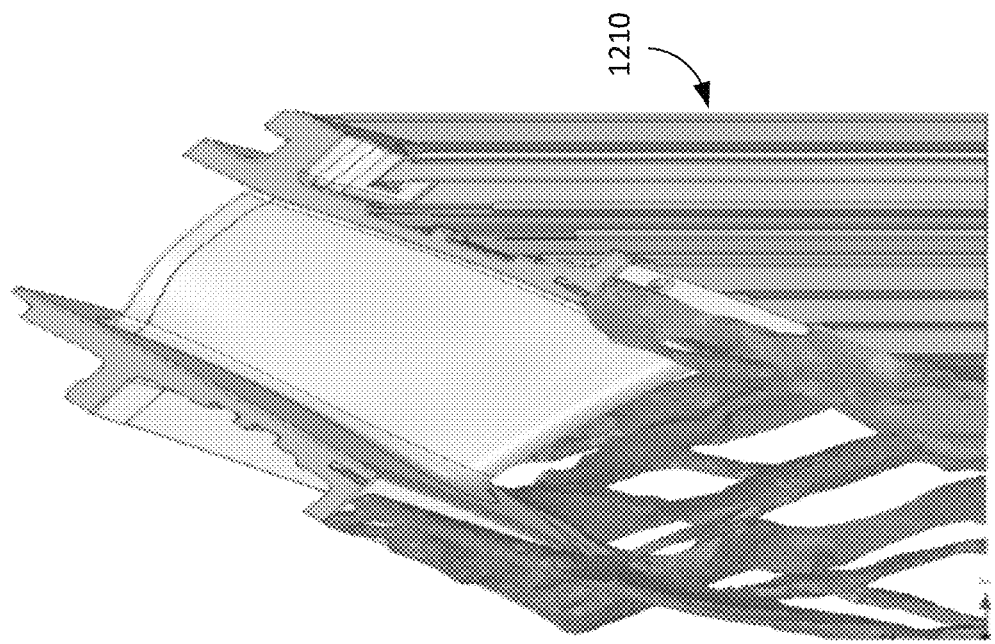
Figure 11:
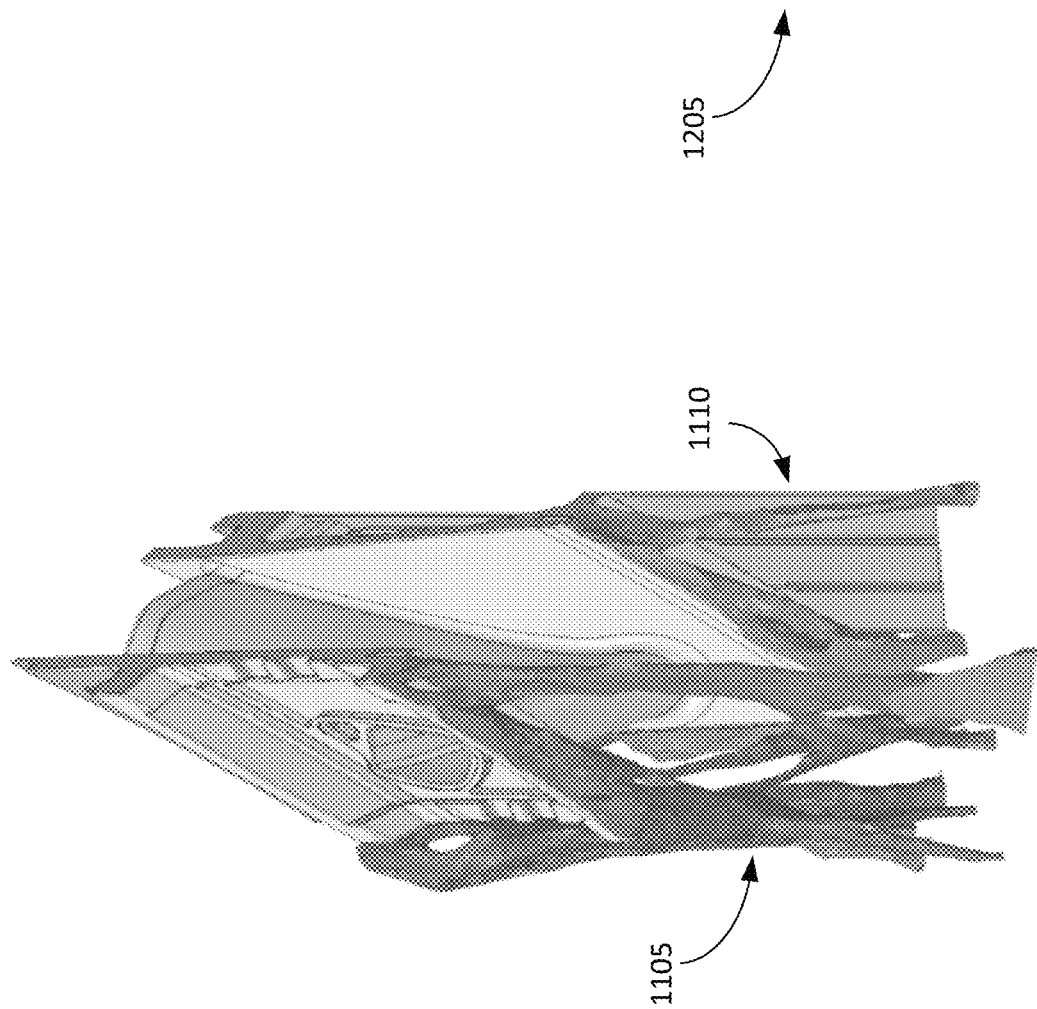
Figure 13:
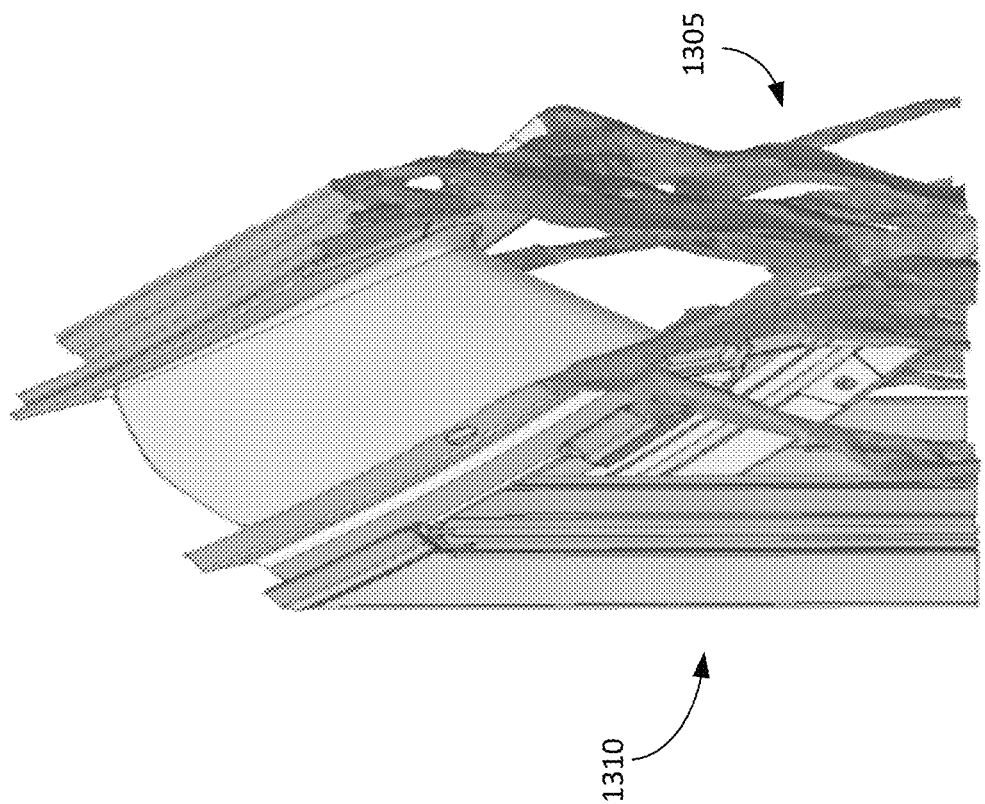

FIG. 11 is an illustrative example of TO supports 1105 and at least some of the baseline supports 1110. The combination of TO supports 1105 and at least some of the baseline supports 1110 may comprise a set of hybrid supports generated by, for example, a first iteration through a hybrid support design flow as disclosed herein. FIGS. 12 and 13 illustrate a set of hybrid supports generated by further iterations of the initially obtained set of supports through the hybrid support design flow(s) disclosed herein. For example, FIG. 12 might correspond to a second iteration and FIG. 13 might correlate to a third iteration, where the TO supports are shown at 1205 and 1305 while the baseline supports are shown at 1210 and 1310. In some aspects, the second and/or third iterations might include, for example, altering the combination of supports to fit a desired base plate, modifying the design space(s) to create a buildable part with removable supports, and other optimizations.

FIG. 14 is an example table 1400 listing some distortions realized for different types of AM process supports, including a set of hybrid supports designed in accordance with some embodiments of the present disclosure. Table 1400 lists maximum distortion (column 1425), mean distortion (column 1430, and standard deviation (column 1435) values for supports designed by an "expert" (row 1405), two examples of TO supports (1410 and 1415), and a set of hybrid supports (row 1420). As seen, the maximum distortion observed for the set of hybrid supports (row 1420) is significantly lower than the "expert" designed supports, as well as the supports designed by a TO process alone. Likewise, the mean distortion and standard deviations are also greatly reduced for the set of hybrid supports as compared to the "expert" designed and TO alone processes.

Figure 15:
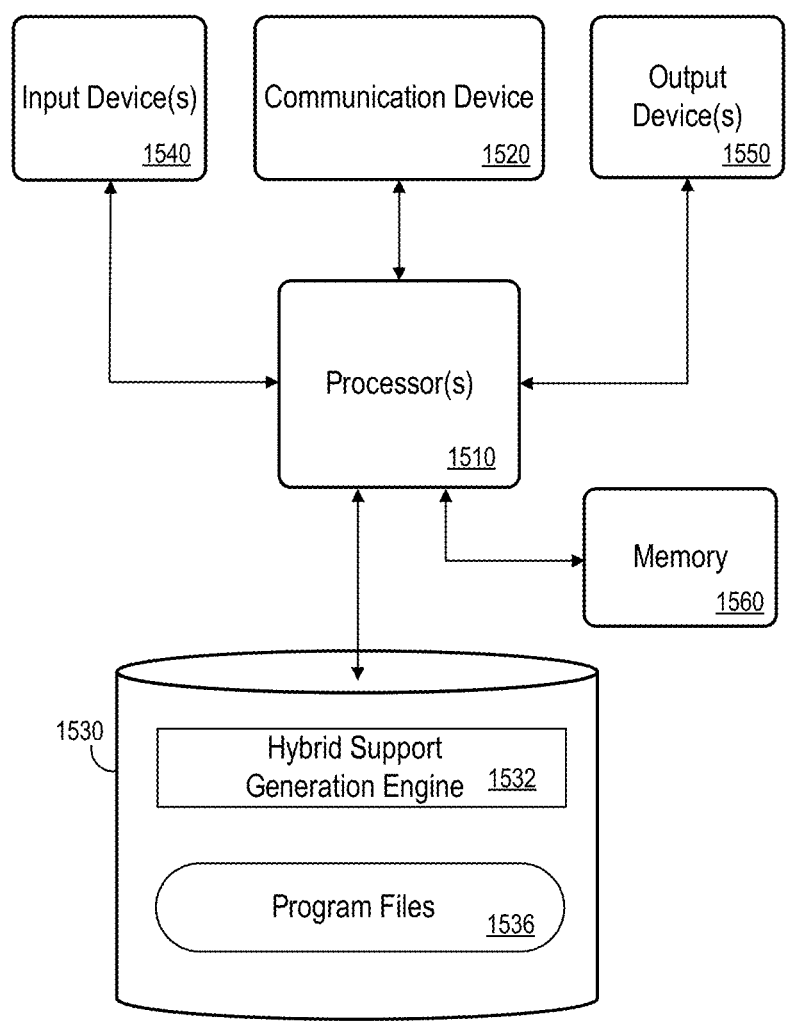
FIG. 15 illustrates a schematic diagram of a system, in accordance with some embodiments.

FIG. 15 is a block diagram of computing system 1500 according to some embodiments. System 1500 may comprise a general-purpose or special-purpose computing apparatus and may execute program code to perform any of the methods, operations, and functions described herein. System 1500 may comprise an implementation of one or more systems (e.g., a hybrid support design tool, an AM system or parts thereof, etc.) and processes (e.g., 600). System 1500 may include other elements that are not shown, according to some embodiments.

System 1500 includes processor(s) 1510 operatively coupled to communication device 1520, data storage device 1530, one or more input devices 1540, one or more output devices 1550, and memory 1560. Communication device 1520 may facilitate communication with external devices, such as a data server and other data sources. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into system 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM), Storage Class Memory (SCM) or any other fast-access memory.

Hybrid support engine 1532 may comprise program code executed by processor(s) 1510 (and within the execution engine) to cause system 1500 to perform any one or more of the processes described herein. Embodiments are not limited to execution by a single apparatus. Data storage device 1530 may also store data and other program code 1536 for providing additional functionality and/or which are necessary for operation of system 1500, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a selection of an optimal part consolidation using a greedy search process (i.e., process 600, FIG. 6).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
    receiving, by a processor, a specification defining a model of a part to be produced by an additive manufacturing (AM) process;
    executing an AM simulation on the model of the part, by the processor, to determine a prediction of thermal distortions to the part due the AM process, the AM simulation to apply a thermal distortion analysis to the model to predict thermal distortion of the part without support and to derive boundary conditions for topology optimization (TO);
    dividing, by the processor based on a) a geometry of the part, b) one or more rules related to geometric features of the geometry, and c) the prediction of thermal distortions from the AM simulation, regions of the part into one or more first regions to interface with TO supports and one or more second regions to interface with rule-based supports;
    executing a (TO) by the processor, based at least in part a) the boundary conditions from the AM simulation and b) the one or more first regions of the part, to create TO supports for a given support volume that counteract the predicted thermal distortions;
    generating, by the processor, at least one rule-based support based on the one or more second regions;
    combining, by the processor, the TO supports and the at least one rule-based support to generate a set of hybrid supports;
    saving a record of the set of hybrid supports; and
    transmitting the record of the set of hybrid supports to an AM controller, the AM controller to control an AM system to generate a support structure for an AM production of the part,
    wherein the record of the set of hybrid supports is input into the AM simulation to at least one of refine or verify the set of hybrid supports.

2. The method of claim 1, wherein the specification defining the model of the part specifies at least one of a geometry of the part, an orientation of the part, and processing conditions for producing the part by the AM process.

3. The method of claim 1, wherein an objective of the TO is to reduce, by the created TO supports, the predicted thermal distortions.

4. The method of claim 1, wherein the TO supports interface with the part at the one or more first regions of the part to provide rigidity to the support structure for the AM production of the part.

5. The method of claim 1, wherein the one or more second regions are one or more non-machinable regions including at least one overhang, and wherein the at least one rule-based support interfaces with the part at the one or more second regions of the part to support the one or more second regions for the AM production of the part.

6. The method of claim 1, wherein the TO is executed, by the processor, further based on a design space defined for optimization.

7. The method of claim 6, wherein the design space interfaces with the part only at selected regions.

8. The method of claim 6, wherein the part and the set of hybrid supports are contained within the design space.

9. The method of claim 1, further comprising performing a shape-size optimization that considers at least one of part shape, part size, a particular AM process constraint, or materials on the at least one rule-based support.

10. The method of claim 1, further comprising executing the TO iteratively, by the processor, on a last generated set of hybrid supports to create optimized TO supports until a part distortion target is satisfied;
    combining, by the processor, the optimized TO supports and the at least one rule-based support to generate a set of optimized hybrid supports;
    saving a record of the set of optimized hybrid supports; and
    transmitting a record of the set of optimized hybrid supports to the AM controller.

11. The method of claim 10, further comprising executing a shape-size optimization that considers at least one of part shape, part size, a particular AM process constraint, or materials on the at least one rule-based support to generate an at least one optimization rule-based support; and combining, by the processor, the optimized TO supports and the at least one optimized rule-based support to generate the set of optimized hybrid supports.

12. A system comprising
a memory storing processor-executable instructions; and
one or more processors to execute the processor-executable instructions to:
receive a specification defining a model of a part to be produced by an additive manufacturing (AM) process;
execute an AM simulation on the model of the part to determine a prediction of thermal distortions to the part due the AM process, the AM simulation to apply a thermal distortion analysis to the model to predict thermal distortion of the part without support and to derive boundary conditions for topology optimization (TO);
divide, based on a) a geometry of the part, b) one or more rules related to geometric features of the geometry, and c) the prediction of thermal distortions from the AM simulation, regions of the part into one or more first regions to interface with TO supports and one ore more second regions to interface with rule-based supports;
execute a TO based at least in part on a) the boundary conditions from the AM simulation and b) the one or more first regions of the part, to create TO supports for a given support volume that counteract the predicted thermal distortions;
generate at least one rule-based support based on the one or more second regions;
combine the TO supports and the at least one rule-based support to generate a set of hybrid supports;
save a record of the set of hybrid supports; and
transmit the record of the set of hybrid supports to an AM controller, the AM controller to control an AM system to generate a support structure for an AM production of the part,
wherein the record of the set of hybrid supports is input into the AM simulation to at least one of refine or verify the set of hybrid supports.

13. The system of claim 12, further comprising performing a shape-size optimization that considers at least one of part shape, part size, a particular AM process constraint, or materials on the at least one rule-based support.

14. The system of claim 12, further comprising executing the TO iteratively, by the processor, on a last generated set of hybrid supports to create optimized TO supports until a part distortion target is satisfied;
combining, by the processor, the optimized TO supports and the at least one rule-based support to generate a set of optimized hybrid supports;
saving a record of the set of optimized hybrid supports; and
transmitting a record of the set of optimized hybrid supports to the AM controller.

15. The system of claim 14, further comprising executing a shape-size optimization that considers at least one part shape/size, a particular AM process constraint, or materials on the at least one rule-based support to generate at least one an optimization rule-based support; and combining, by the processor, the optimized TO supports and the at least one optimized rule-based support to generate the set of optimized hybrid supports.

16. A non-transitory computer-readable medium storing instructions that, when executed by a computer processor, cause the computer processor to perform a method comprising:
receiving a specification defining a model of a part to be produced by an additive manufacturing (AM) process;
executing an AM simulation on the model of the part, by the processor, to determine a prediction of thermal distortions to the part due the AM process, the AM simulation to apply a thermal distortion analysis to the model to predict thermal distortion of the part without support and to derive boundary conditions for topology optimization (TO);
dividing, by the processor based on a) a geometry of the part, b) one or more rules related to geometric features of the geometry, and c) the prediction of thermal distortions from the AM simulation, regions of the part into one or more first regions to interface with TO supports and one or more second regions to interface with rule-based supports;
executing a TO, by the processor, based at least in part on a) the boundary conditions from the AM simulation and b) the one or more first regions of the part, to create TO supports for a given support volume that counteract the predicted thermal distortions;
generating, by the processor, at least one rule-based support based on the one or more second regions;
combining, by the processor, the TO supports and the at least one rule-based support to generate a set of hybrid supports;
saving a record of the set of hybrid supports; and
transmitting the record of the set of hybrid supports to an AM controller, the AM controller to control an AM system to generate a support structure for an AM production of the part,
wherein the record of the set of hybrid supports is input into the AM simulation to at least one of refine or verify the set of hybrid supports.

17. The medium of claim 16, further comprising performing a shape-size optimization that considers at least one of part shape, part size, a particular AM process constraint, or materials on the at least one rule-based support.

18. The medium of claim 16, further comprising executing the TO iteratively, by the processor, on a last generated set of hybrid supports to create optimized TO supports until a part distortion target is satisfied;
combining, by the processor, the optimized TO supports and the at least one rule-based support to generate a set of optimized hybrid supports;
saving a record of the set of optimized hybrid supports; and
transmitting a record of the set of optimized hybrid supports to the AM controller.

19. The medium of claim 18, further comprising executing a shape-size optimization that considers at least one of part shape, part size, a particular AM process constraint, or materials on the at least one rule-based support to generate at least one an optimized rule-based support; and
combining, by the processor, the optimized TO supports and the at least one optimized rule-based support to generate the set of optimized hybrid supports.

* * * * *